(12) United States Patent
Azizullah et al.

(10) Patent No.: US 10,979,325 B2
(45) Date of Patent: Apr. 13, 2021

(54) PROTOCOL INDEPENDENT SPEED TESTING SERVICE

(71) Applicant: Verizon Patent and Licensing Inc., Arlington, VA (US)

(72) Inventors: Hamid U. Azizullah, Ashburn, VA (US); Akhil Dayal, Warren, NJ (US); Kevin Lu, Bridgewater, NJ (US); Gimbert R. Richiez, Arlington, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 260 days.

(21) Appl. No.: 15/875,088

(22) Filed: Jan. 19, 2018

(65) Prior Publication Data
US 2019/0230012 A1 Jul. 25, 2019

(51) Int. Cl.
*H04L 12/26* (2006.01)
*H04L 12/24* (2006.01)
*H04L 29/06* (2006.01)
*H04L 29/12* (2006.01)
*H04L 29/08* (2006.01)

(52) U.S. Cl.
CPC ........ *H04L 43/065* (2013.01); *H04L 41/0213* (2013.01); *H04L 41/0226* (2013.01); *H04L 41/5061* (2013.01); *H04L 43/18* (2013.01); *H04L 43/50* (2013.01); *H04L 69/16* (2013.01); *H04L 43/0888* (2013.01); *H04L 61/1511* (2013.01); *H04L 67/02* (2013.01); *H04L 67/06* (2013.01)

(58) Field of Classification Search
CPC ............. H04L 41/0213; H04L 41/5061; H04L 43/065; H04L 43/0888; H04L 43/18; H04L 61/1511; H04L 67/02; H04L 67/06; H04L 69/16
See application file for complete search history.

(56) References Cited

U.S. PATENT DOCUMENTS

2013/0227103 A1* 8/2013 Garimella ........... H04L 41/5054
709/223
2013/0272146 A1* 10/2013 Jones ...................... H04L 43/50
370/252

(Continued)

OTHER PUBLICATIONS

TR-106 Data Model Template for TR-069-Enabled Devices; issue 1 amendment 7 issue date: Sep. 2013; editor: Lupton (Year: 2013).*

*Primary Examiner* — June Y Sison

(57) ABSTRACT

A method, a device, and a non-transitory storage medium are described in which a speed testing service is provided. The speed testing service includes a protocol independent data model that has no dependency on a management protocol. The speed testing service can be triggered via an application programming interface request. An agent of an end device or customer premise equipment is configured to respond to the application programming request, and generate and transmit a test request to a network device based on the data model. The agent stores all files and data to initiate a test, perform a test, and obtain a test result. The network device is configured to schedule the test based on the test request, and generate and transmit a test response based on the data model. The network device is configured to perform the test and provide test results.

20 Claims, 10 Drawing Sheets

(56) References Cited

U.S. PATENT DOCUMENTS

2014/0341566 A1* 11/2014 Smith ................ H04B 10/0775
                                                              398/30
2016/0234705 A1*  8/2016 Elliott .................. H04W 76/10
2019/0065352 A1*  2/2019 Patel ................... G06F 11/3688

* cited by examiner

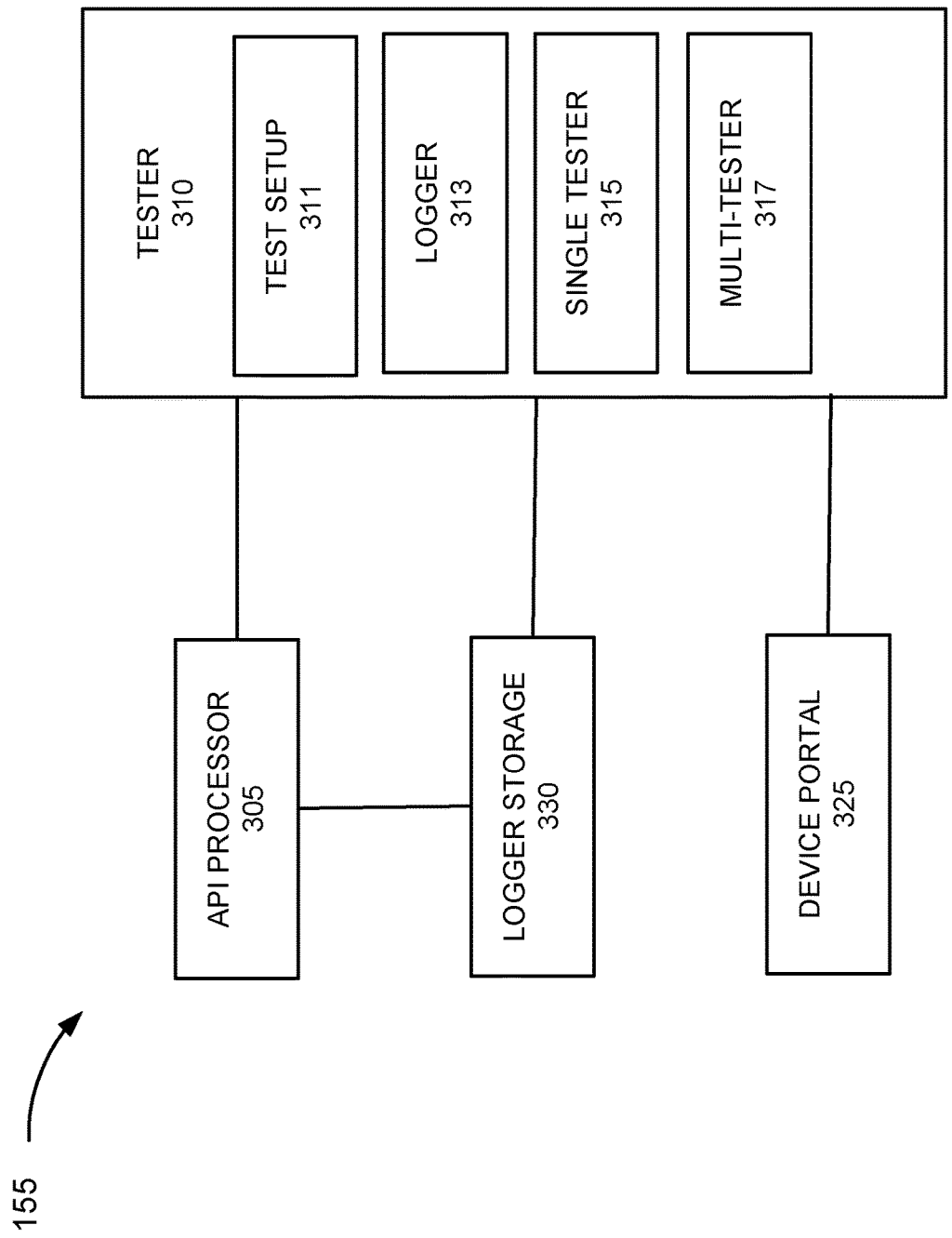

| SOURCE PORT 352 | DESTINATION PORT 354 |
|---|---|
| LENGTH 356 | CHECKSUM 358 |
| MAC ADDRESS 360 ||
| MAC ADDRESS 360 | COMMAND 362 |
| COMMAND EXT 364 | SPEED TIER 366 |
| NEXT_REQUEST_TIME 368 ||
| RESERVED 370 ||
| DOWNLOAD URL 374 ||
| UPLOAD URL 376 ||
| TEST_REQUEST_INTERVAL 378 ||

Fig. 3B

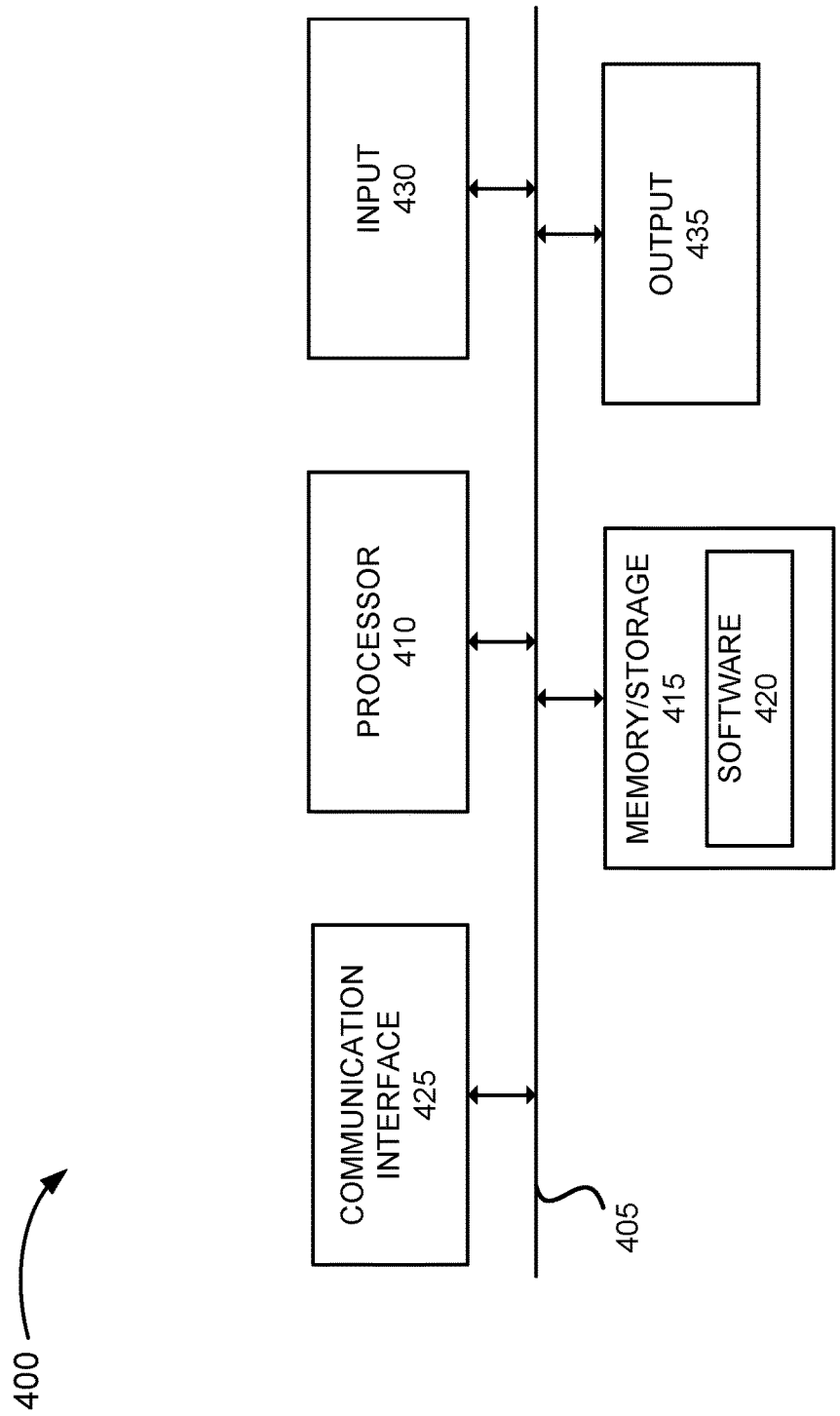

PROTOCOL INDEPENDENT SPEED TESTING SERVICE

BACKGROUND

A network-side speed testing system generally measures bandwidth (e.g., upload speed, download speed) and perhaps other service quality parameters. For example, a user of a user device may initiate a test with the speed testing system. The test may include measuring upload and download speeds, and providing a test result to the user via the user device.

BRIEF DESCRIPTION OF THE DRAWINGS

FIG. 3A is a diagram illustrating exemplary components of an agent depicted in FIG. 1;

FIG. 3B is a diagram illustrating an exemplary test request according to an exemplary embodiment of a data model;

FIG. 4 is a diagram illustrating exemplary components of a device that may correspond to one or more of the devices illustrated and described herein;

DETAILED DESCRIPTION OF PREFERRED EMBODIMENTS

Figure 1:
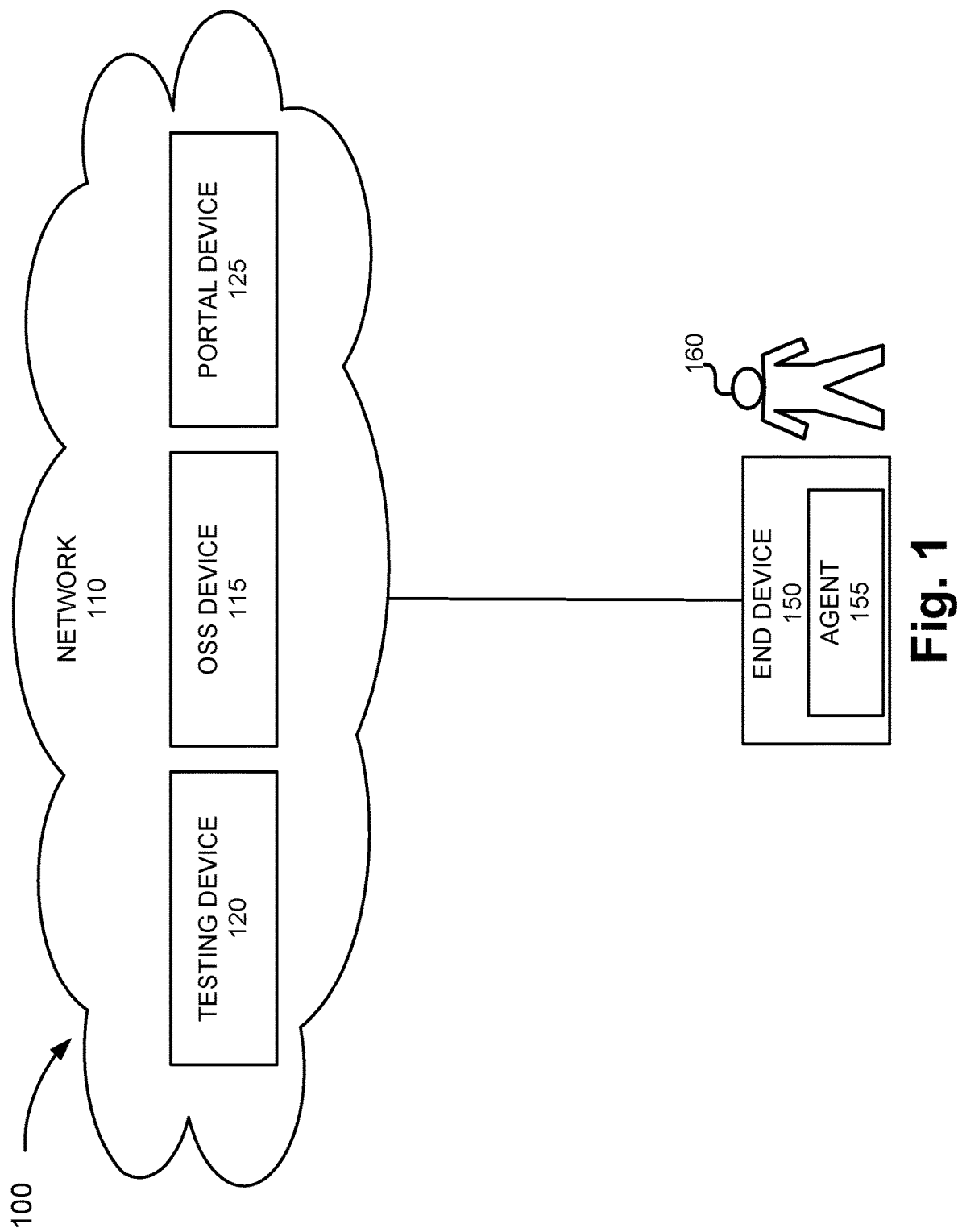
FIG. 1 is a diagram illustrating an exemplary environment in which an exemplary embodiment of a speed testing service may be implemented.

The following detailed description refers to the accompanying drawings. The same reference numbers in different drawings may identify the same or similar elements. Also, the following detailed description does not limit the invention.

A service provider may offer to its customers the ability to initiate a speed test with a speed testing system in order to test upload and download speeds associated with various user devices. Typically, the speed testing system and the user device use a particular management protocol (e.g., Technical Report 069 (TR069) (also known as Customer-Premises Equipment Wide Area Network Management Protocol (CWMP)), Simple Network Management Protocol (SNMP), etc.) for implementing the speed test. Given this protocol dependency, depending on the type of user device and its operating system (e.g., Mac, Windows, Android, iOS, Linux, proprietary, etc.), the user device may require additional packages/executable files to be installed before any speed test can be performed. Additionally, a customer that wishes to conduct a speed test via a web browser can be required to install a plug-in (e.g., Adobe Flash or Java Applet).

Additionally, protocol dependency can yield further limitations and inefficiencies. For example, the CWMP defines data model requirements that must be adhered to in order to carry out a speed testing procedure. Additionally, an end device has to compile the individual parameters of the CWMP to form a test request. This results in latency and inefficient use of resources (e.g., processing, memory, communication interface, etc.) at the end device. Further, the complexity of messages (e.g., length of messages, processing of messages, etc.) can result in latency and inefficient use of resources (e.g., processing, memory, communication interface, etc.) at the network side.

Aside from protocol dependency, there are other problems associated with current speed testing systems. For example, a customer may initiate a speed test from a mobile device (or other user device (e.g., a desktop computer, etc.), which is connected to a wireless router (e.g., a WiFi or broadband wireless router) residing in his or her residence, and the speed testing system. Given the limitations of bandwidth associated with the wireless connection between the wireless router and the mobile device, a speed test result does not accurately represent the upload and download speeds between the wireless router and the speed testing system. As a result, the customer may perceive that certain Quality of Service (QoS) requirements of a service plan are not being satisfied by the service provider. Additionally, current speed testing system may not offer an option for the customer to select any customer premise equipment (e.g., a wireless router, a broadband router, a customer-side line termination device (e.g., an optical line termination (OLT) device, etc.)) to which the speed test is directed.

According to exemplary embodiments, a speed testing service is described. According to exemplary embodiments, the speed testing service provides testing of upload speeds and download speeds between a network-side device and an end user-side device. According to an exemplary embodiment, the speed testing service provides testing of other types of network performance metrics (e.g., throughput, (ping) latency, packet loss, etc.). According to various exemplary embodiments, the speed testing service may provide test result information to a user upon completion of the test or may store and make available test result information for later access and retrieval by the user.

According to an exemplary embodiment, the end user-side device includes a speed testing agent. According to an exemplary embodiment, the speed testing agent includes logic that provides the speed testing service on the end-user side. For example, the speed testing agent includes logic that initiates a test, conducts a test, and obtains a test result based on receiving an Application Programming Interface (API) request. In this regard, the end user-side device does not require any additional packages or executable files to use the speed testing service (other than the speed testing agent), and the speed testing agent is platform/architecture independent. For example, the speed testing agent may be installed on various types of end user-side devices that may run different operating systems (e.g., Mac, Windows, Android, iOS, Linux, a custom operating system, etc.). Additionally, for example, the speed testing agent may be installed on various types of customer premise equipment (CPE), universal CPE (uCPE), or other type of device that may not be directly operated by a user. According to an exemplary embodiment, the speed testing agent may be implemented as a daemon application. According to an exemplary embodiment, the speed testing agent includes logic that supports scheduled and on-demand tests.

According to exemplary embodiments, the speed testing agent includes logic that generates a test request based on a data model that has no dependency on a management protocol (e.g., CWMP, SNMP, etc.) or other types of dependencies (e.g., JAVA, Flash, Rocksaw, etc.) in order to initiate a test, conduct the test, and obtain a test result. According to an exemplary embodiment, the speed testing agent includes logic that generates the test request without compiling. For example, based on the received API request, the speed testing agent includes logic to determine the type of test to be conducted and select parameters/parameter values, which are stored by the speed testing agent, in order to generate the test request. As a result, the speed testing agent may reduce latency with respect to initiating a test, performing a test, and receiving test results, as well as reduce the utilization of resources by the end device. This is in contrast to the CWMP standard in which an auto configuration server (ACS) is used. For example, the ACS sets each individual parameter and parameter value for a test and provides these parameters and parameter values to the end device, which introduces latency and requires additional use of various resources on the network-side (e.g., the ACS, links, etc.) and the end device side. Additionally, the use of the ACS can add an extra hop and point-of-failure between end device and a testing server.

According to an exemplary embodiment, the speed testing agent includes logic that generates and transmits the test request in the payload of a single User Datagram Protocol (UDP) packet. The test request carries all parameters and parameter values to initiate a test, perform the test, and obtain test result information.

According to an exemplary embodiment, the speed testing agent includes logic to receive and re-configure a default parameter value, which is stored by the speed testing agent and used during a test, without upgrading software (e.g., a software patch or a complete replacement) of the speed testing agent. For example, a remote user (e.g., a developer, an administrator, or other personnel associated with the service provider) may modify the default parameter value.

According to an exemplary embodiment, the network-side device includes logic that provides the speed testing service on the network-side. For example, the network-side device includes logic that initiates (e.g., schedules) a tester device to perform a test, performs the test, and provides a test result. According to an exemplary embodiment, the network-side device includes logic that uses a data model, which has no dependency on a management protocol or other dependencies (e.g., client-side plug-ins, etc.), in order to process and interpret the test request received from the speed testing agent.

According to an exemplary embodiment, the network-side device includes logic that generates and transmits a test response, which is responsive to the test request, based on the data model. According to an exemplary embodiment, the network-side device includes logic that generates and transmits the test response in the payload of a single UDP packet. The test response carries all parameters and parameter values for the speed testing agent to initiate a test with a scheduled tester device, perform the test, and obtain test result information.

FIG. 1 is a diagram illustrating an exemplary environment 100 in which an exemplary embodiment of a speed testing service may be implemented. As illustrated, environment 100 includes a network 110. Network 110 may include an Operations Support System (OSS) 115, a testing device 120, and a portal device 125. As further illustrated, environment 100 includes an end device 150. End device 150 includes an agent 155 and may be operated by a user 160.

The number, type, and arrangement of network devices in network 110, and the number and type of end devices 150 are exemplary. According to other embodiments, environment 100 may include additional devices, fewer devices, and/or differently arranged devices, than those illustrated in FIG. 1. For example, a single device in FIG. 1 may be implemented as multiple devices and/or multiple devices may be implemented as a single device. A network device, a network element, or a network function (referred to herein simply as a network device) may be implemented according to a centralized computing architecture, a distributed computing architecture, a cloud computing architecture (e.g., an elastic cloud, a private cloud, a public cloud, etc.), or a web service architecture. Additionally, a network device may be implemented according to one or multiple network architectures (e.g., a client device, a server device, a peer device, a proxy device, a cloud device, a virtualized function, etc). According to other exemplary embodiments, environment 100 may include additional networks and/or different networks than those illustrated and described herein.

Environment 100 includes a communication link between the network devices and end device 150. Environment 100 may be implemented to include a wired, an optical, and/or a wireless communication link among the devices illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

Network 110 includes one or multiple networks of one or multiple types and technologies that host the speed testing service, as described herein. For example, network 110 may be implemented to include the Internet, the World Wide Web (WWW), a Wide Area Network (WAN), a Metropolitan Area Network (MAN), a private network, a public network, an Internet Protocol (IP) network, a virtual network, a software-defined network (SDN), a wireless network, a wired network, an optical network, an access network, a core network, a cloud network, a packet-switched network, a service provider network, some other type of terrestrial-based network, or some combination thereof.

According to an exemplary embodiment, OSS device 115 includes a network device comprising logic that provides a speed testing service. According to an exemplary embodiment, agent 155 of end device 150 may communicate with OSS device 115 to initiate a test. For example, OSS device 115 includes logic that receives a test request from end device 150 in relation to the speed testing service. In response to receiving the test request, OSS device 115 includes logic that selects a testing device to service the request and provides a test response to end device 150.

According to an exemplary embodiment, OSS device 115 performs a look-up or queries a database or other type of data/information structure in order to select the testing device. For example, the database or other data/information structure may correlate types of test information with information indicating locations and network addresses of testing devices. OSS device 115 may use this information when performing the look-up or query. For example, OSS device 115 may include logic that performs the look-up or query based on the type of test. By way of further example, the type of test may based on the protocol type, such as a Hypertext Transfer Protocol (HTTP) test, a UDP test, a File Transfer Protocol (FTP) test, or some other type of application layer-based protocol. According to another example, the type of test may be based on some other attribute of the test. For example, the type of test may be a ping test, a Domain Name System (DNS) test, or a network performance metric (e.g., an upload speed test, a throughput test, etc.). According to an exemplary implementation, the test request may include data that indicates the type of test. In this way, OSS device 115 may select a testing device 120 that is configured to perform the type of test requested.

OSS device 115 may include logic that considers other information pertaining to the test request. For example, OSS device 115 may perform the look-up or query based on the geographic location of end device 150 relative to the geographic location of a testing device that is configured to provide the type of test requested. According to an exemplary implementation, the test request may include data that indicates a location of end device 150. According to another exemplary implementation, OSS device 115 may use well-known techniques to determine the location of end device 150. In this way, OSS device 115 may select a testing device 120 that is located in a geographic area near end device 150.

According to an exemplary embodiment, in response to selecting a testing device 120, OSS device 115 includes logic that generates a test response. According to an exemplary embodiment, the test response includes an API request. According to an exemplary implementation, the API request is a Representational State Transfer (REST) API request. According to other exemplary implementations, the API request may be another type of API request. In either case, the API request includes a network address (e.g., an IP address, a fully qualified domain name (FQDN), a Uniform Resource Locator (URL), or other Uniform Resource Identifier (URI)) of the selected test device 120. OSS device 115 includes logic that transmits the test response to end device 150.

Figure 2:
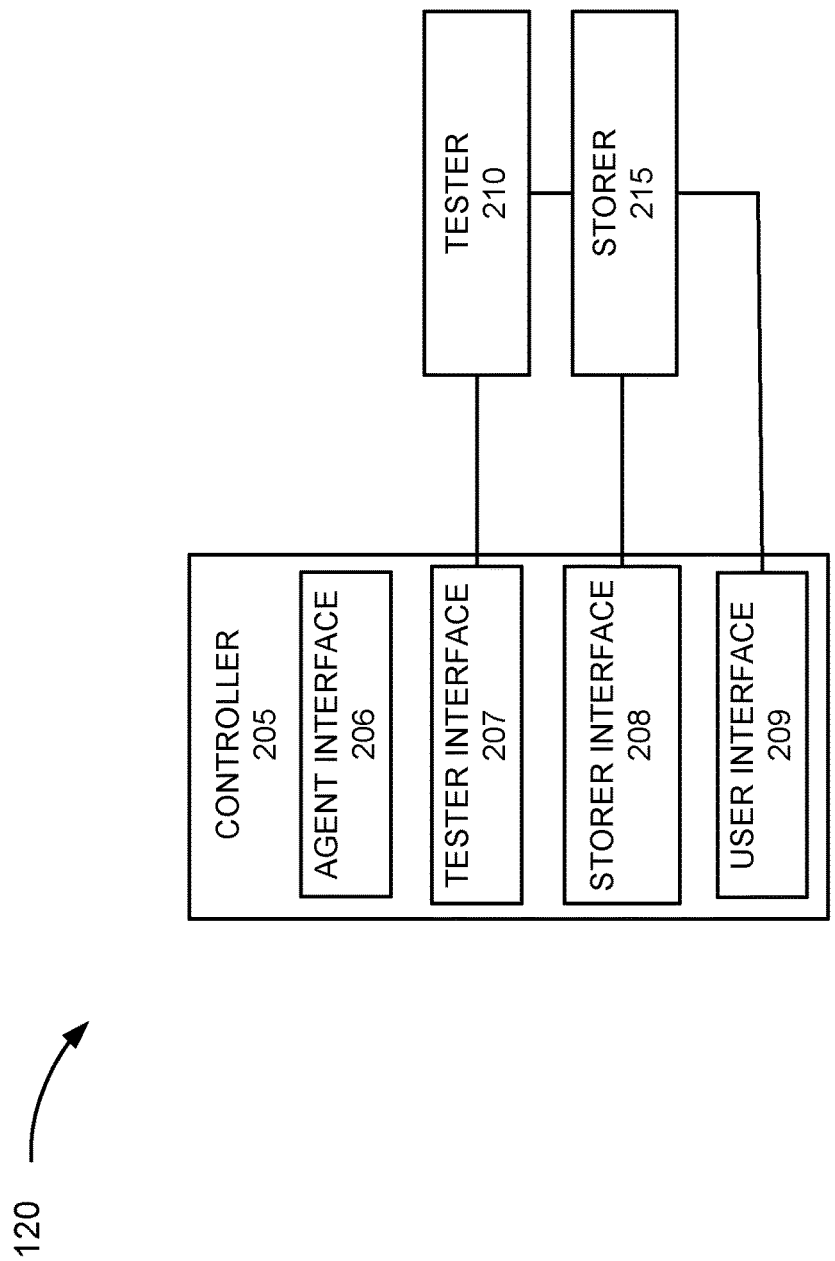
FIG. 2 is a diagram illustrating exemplary components of a testing device depicted in FIG. 1.

According to an exemplary embodiment, testing device 120 includes a network device comprising logic that provides a speed testing service. FIG. 2 is a diagram illustrating exemplary components of testing device 120. As illustrated, testing device 120 may include a controller 205, a tester 210, and a storer 215. As further illustrated, controller 205 may include an agent interface 206, a tester interface 207, a storer interface 208, and a user interface 209. According to other exemplary embodiments, testing device 120 may include additional, fewer, and/or different components than those illustrated and described herein. In this regard, the depiction of components in FIG. 2 and the accompanied description set forth herein are merely exemplary, and alternate implementations may be used to achieve the same or equivalent functional result in relation to the component and/or the speed testing service of the network device, as described herein. A component may be implemented on one or multiple network devices. Additionally, or alternatively, a network device may be implemented to include one or multiple components. The connections between components, as illustrated in FIG. 2, are exemplary.

Referring to FIG. 2, controller 205 may include logic that manages the provisioning of the speed testing service. For example, controller 205 may manage network devices that provide a network-side speed testing service, as described herein.

According to an exemplary embodiment, controller 205 includes agent interface 206. According to an exemplary embodiment, agent interface 206 includes logic that communicates with agent 155 of end device 150. For example, agent interface 206 may receive messages from and transmit messages to end device 150 pertaining to the speed testing service and according to a (pre-defined) messaging structure.

According an exemplary embodiment, agent interface 206 includes logic that identifies and parses test parameters and test parameter values, which are included in a payload of a transport layer packet (e.g., a UDP packet) and received from agent 155, and uses the test parameters and test parameter values to provision a test. According to an exemplary embodiment, agent interface 206 includes logic that uses a (pre-defined) data model. For example, the data model may define the available parameters, parameter values, and syntax pertaining to the speed testing service and various tests that may be performed. According to an exemplary implementation, the parameters may include parameters indicating the type of test, the number of tests (e.g., single, multiple), the ports associated with the test, and other parameters that may depend on the type of test, as described herein. The data model associated with a test request and a test response is described further below.

According to an exemplary embodiment, tester interface 207 includes logic that communicates with tester 210. For example, tester interface 207 may receive messages from and transmit messages to tester 210 pertaining to the speed testing service. According to an exemplary embodiment, tester interface 207 includes logic that may select a tester 210 from among multiple testers 210 based on load balancing considerations and/or capabilities of testers 210. For example, according an exemplary implementation, tester 210 may be configured to perform only certain types of tests and/or perform certain types of tests having certain parameters/parameter values. According to other exemplary implementations, tester 210 may be configured to perform each and every test available from the speed testing service.

According to an exemplary embodiment, in response to receiving a test request from agent 155 of end device 150, tester interface 207 includes logic that performs a look-up in or a query to a database or other type of data/information structure. Based on a result of the look-up or the query, tester interface 207 may identify one or multiple testers 210 that are configured to perform the test. For example, the database or other type of data/information structure may store profile information pertaining to tester 210. By way of further example, the profile information may indicate the capabilities of tester 210 (e.g., types of tests able to perform, parameter/parameter value restrictions (e.g., packet size, upload/download speeds, etc.)).

According to an exemplary embodiment, tester interface 207 includes logic that communicates with a candidate tester 210. For example, tester interface 207 may generate a request, and transmit the request to the candidate tester 210. The request may include data that indicates a request of availability to perform a test. The request may or may not include other test information pertaining to the test (e.g., test parameters, test parameter values, etc.). Tester interface 207 may determine whether the candidate tester 210 is able to perform the test based on receiving a response from the candidate tester 210. For example, the response may indicate an acceptance or a refusal to perform the test. Tester interface 207 includes logic that repeats the querying of candidate testers 210 until an acceptance is received or every candidate tester 210 has been queried. As an example, according to a clustered architecture or server farm architecture, tester interface 207 may query one or multiple candidate testers 210 included in the cluster or the server farm.

According to an exemplary embodiment, tester interface 207 includes logic that generates a test response in response to selecting the candidate tester 210 that indicated acceptance to perform the test. For example, the test response may include a network address or other type of URI (e.g., FQDN, etc.) of the selected tester 210. Tester interface 207 includes logic that transmits the test response to agent 155 of end device 150.

According to other exemplary embodiments, various other types of load-balancing procedures may be implemented. For example, controller 205 may obtain (via a push method, pull method, polling method, etc.) load information pertaining to tester 210. The load information may be updated proactively, periodically, reactively, or according to some other mechanism. The load information may include information indicating the current available network resources, the number of tests currently being performed, the number of tests scheduled to be performed, and so forth. Tester interface 207 may include logic that selects tester 210 based on this load information.

According to an exemplary embodiment, storer interface 208 includes logic that communicates with storer 215. For example, storer interface 208 includes logic that obtains test result information from storer 215. According to an exemplary embodiment, storer interface 208 obtains test result information based on a request received from a user via user interface 209.

According to an exemplary embodiment, user interface 209 includes logic that provides a graphical user interface (GUI). For example, the graphical user interface may allow a user (e.g., a developer, a customer, an administrator, etc.) to search and access test result information stored in storer 215. The graphical user interface may include graphical elements to select and/or input one or multiple data instances for use to search for one or multiple test results.

Tester 210 includes logic that performs a test based on test parameters and test parameter values. According to various exemplary embodiments, tester 210 includes logic that may perform one or multiple types of tests, as described herein. For example, tester 210 may perform an upload speed test, a download speed test, a DNS test, a ping test, and/or another type of network performance metric test. Tester 210 includes logic that generates and stores test result information in storer 215 based on the performance of a test.

Storer 215 may include a database management system (DBMS). The DBMS may be implemented using conventional, well-known, or commercially available relational or No Structured Query Language (NoSQL) software/packages (e.g., Microsoft SQL, Oracle Database, Cassandra, MongoDB, etc.). Storer 215 may include a storage device that stores a database. Storer 215 may include logic that stores the test result information, and performs other storage-related functions, such as, deletes, additions, updates, searches or lookups, etc., pertaining to the test result information in support of the speed testing service. The test result information may be implemented to include various types of information including, for example, information that indicates a success of a test, a failure or an error associated with a test, an upload speed value (e.g., Megabits/second (Mbp/s), Gigabits/second (Gbp/s), Megabytes/second (MBp/s), etc.), a download speed value, a throughput value, a latency value, a test identifier, a tester identifier, an agent 155 and/or end device identifier, a tester 210 location, date and time of test, duration of test, the test protocol (e.g., Transmission Control Protocol (TCP), UDP, etc.), the port type and number (e.g., UDP Port 5060, etc.), and so forth.

Referring back to FIG. 1, according to an exemplary embodiment, portal device 125 includes a network device comprising logic that provides a speed testing service. According to an exemplary embodiment, portal device 125 includes logic that allows a user (e.g., a developer, an administrator, or other service provider personnel) to configure default parameters values stored by agent 155 of end device 150. Portal device 125 includes a graphical user interface that allows the user to select or enter default parameter values pertaining to a type of test of the speed testing service. Portal device 125 includes logic that communicates with agent 155 and stores the modified default parameter values. As an example, the modified default parameter value may pertain to a default parameter, such as a particular size of a packet, test duration, test schedule, test form selection, or other type of default parameter of a test. In this way, portal device 125 provides for the re-configuration of agent 155 and speed testing service at the end device-side without modifying the executable code of agent 155. According to an exemplary embodiment, portal device 125 includes logic that allows the user to initiate a test between testing device 120 and agent 155, and obtain the test result information.

End device 150 includes a device that has computational and communication capabilities. For example, end device 150 may be implemented as a mobile device, a portable device, or a stationary device. By way of further example, end device 150 may be implemented as a computer (e.g., a desktop, a laptop, a palmtop), a smartphone, a personal digital assistant, a tablet, a netbook, a phablet, or other type of user device. According to other examples, end device 150 may be implemented as CPE, uCPE, or other type of device that may not be directly operated by a user. For example, end device 150 may be implemented as a router, a router and modem device, an OLT device, a modem device, a set-top box, or a media server.

As previously described, end device 150 includes agent 155. Agent 155 includes logic that provides the end device-side of the speed testing service, as described herein. For example, the speed testing agent includes logic that initiates a test, conducts a test, and obtains a test result based on receiving an API request. The speed testing agent is platform/architecture independent. Additionally, as previously described, the speed testing agent does not have a dependency on a management protocol in order to initiate a test, conduct the test, and/or obtain a test result.

Figure 3C:
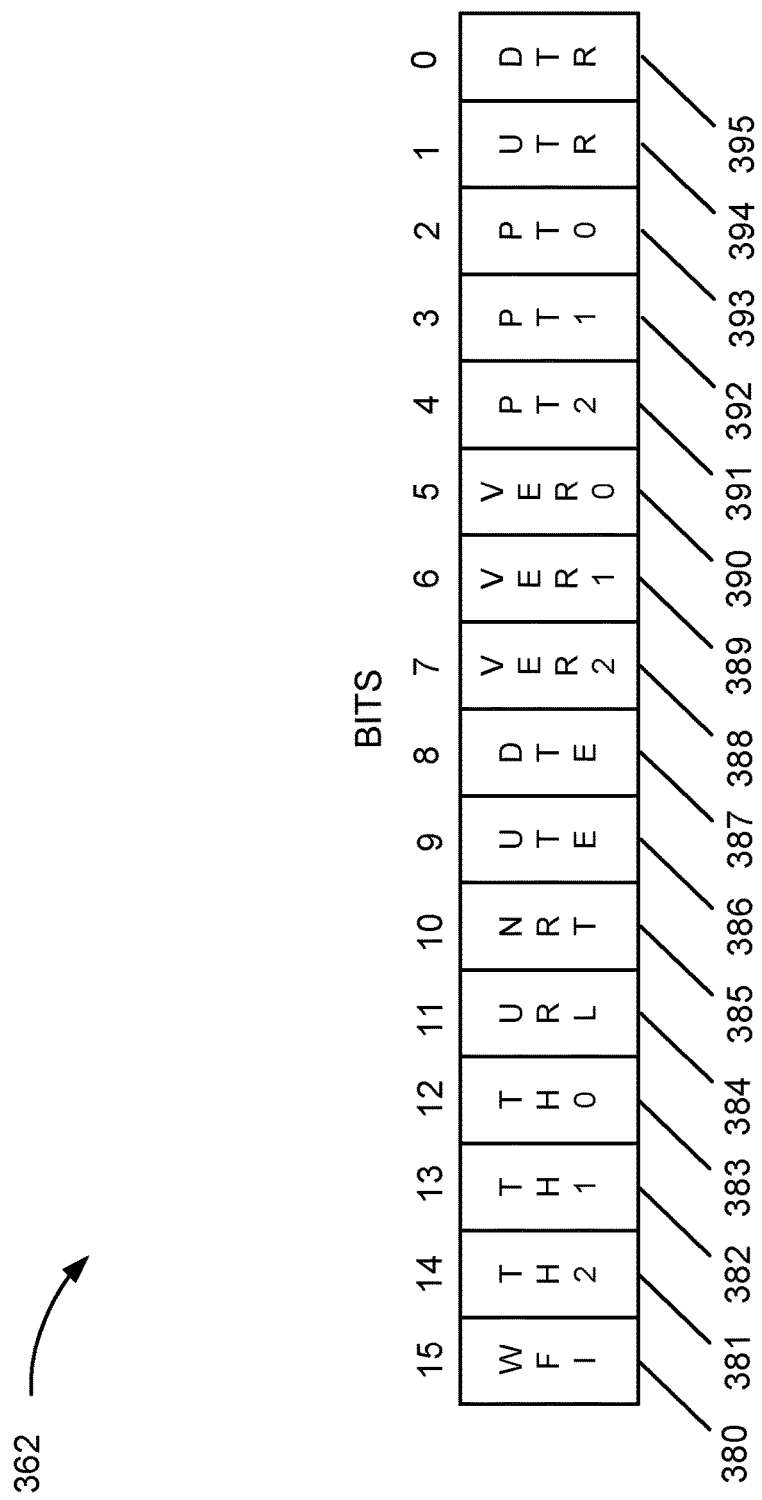
FIG. 3C is a diagram illustrating exemplary bit information included in a command field of the test request depicted in FIG. 3B.

FIG. 3A is a diagram illustrating exemplary components of agent 155. As illustrated, agent 155 may include an API processor 305, a tester 310, a device portal 325, and a logger storage 330. As further illustrated, tester 310 includes a test setup 311, a logger 313, a single tester 315, and a multi-tester 317. According to other exemplary embodiments, agent 155 may include additional, fewer, and/or different components than those illustrated and described herein. In this regard, the depiction of components in FIG. 3A and the accompanied description set forth herein are merely exemplary, and alternate implementations may be used to achieve the same or equivalent functional result in relation to the component and/or the speed testing service of the end device, as described herein. The connections between components, as illustrated in FIG. 3A, are exemplary.

API processor 305 includes logic that receives an API request from OSS device 115. API processor 305 includes an interface to communicate with OSS device 115 and may listen for an API request (e.g., a REST API request) received via a pre-defined port. In response to receiving the API request, API processor 305 may pass the API request to tester 310. API processor 305 may be configured based on an API definition file. The definition file may specify parameters/parameter values pertaining to the speed testing service. An exemplary table that illustrates exemplary parameters and parameter values is provided below.

TABLE 1

| Parameter | Type | Value | Description |
|---|---|---|---|
| Server | String | IP/FQDN | Address of Server |
| WaitForResult | Boolean | True/False | If True, maintain API session until test is completed and test result is published |
| ThreadNumber | Integer | 1-7 | Number of threads to be used for each direction test |
| ScheduleDownload | Boolean | True/False | If false, only upload If true, download |
| ScheduleUpload | Boolean | True/False | If false, only download If true, upload |
| Period | Integer | Value in seconds | Period between each test. For example, period = 60 means test is performed every 60 seconds. To stop a periodic test, a separate API session will be used with a value of period = stop |
| Test Protocol | String | HTTP, UDP_Througput, DNS, Path_Ping, TWAMP, FTP, PUM, UDP_Echo_Plus_Reverse | Specifies protocol of test |

The API request from OSS device 115 may include the server parameter, which may indicate the network address of testing device 120. The API request from OSS device 115 may include the test protocol parameter, which may indicate the protocol of the test and/or the type of test. For example, the parameter may indicate HTTP, UDP, DNS, Ping, Two-Way Active Measurement Protocol (TWAMP), FTP, and/or packet usage monitor (PUM). The API request may include other parameters as illustrated and described in Table 1. For example, the period parameter may indicate a single test when the value is zero, otherwise multiple tests may be performed based on the period parameter value. In the multiple test mode, the testing may continue to run until the user instructs the testing to stop via the API. Also, the wait for result parameter may indicate a time to wait for a test result subsequent to the passing of the API request to tester 310 that initiates a test. According to other exemplary implementations, additional, different, and/or fewer parameters may be implemented. Additionally, the values of the parameter values illustrated and described in relation to Table 1 are merely exemplary. Also, according to some exemplary implementations, a parameter may have a default value. For example, the test protocol parameter may have a default value of HTTP, the period parameter may have a default value of zero, and so forth.

Tester 310 includes logic that manages the end device-side of the speed testing service. For example, tester 310 may coordinate various operations and communications between components of agent 155.

Test setup 311 includes logic that provisions any file, library, and/or other entities in order to initiate a test, perform a test, and obtain test results. For example, test setup 311 may read and identify the type of test indicated in the API request received from API processor 305. In response to identifying the type of test, test setup 311 may access a Java file (e.g., Java Archive (JAR)), which is stored by agent 155. The Java file may define a class for each type of test. Test setup 311 may select the class corresponding to the identified type of test. The Java file may store all default parameters, default parameter values, options, and option values pertaining to a particular type of test, along with libraries that agent 155 may use. Test setup 311 may also include logic to invoke various functions (e.g., a transmitter, a receiver, etc.) that are specified to communicate with testing device 120 in order to initiate, perform, and obtain results from a test. For example, if the API request indicates an HTTP test, test setup 311 may select an HTTP class from the Java file and an HTTP transmitter/receiver may be used to transmit and receive messages pertaining to the test. Test setup 311 may also identify whether a single test or multiple tests are to be performed based on the period parameter value, as well as coordinate for other options that pertain to API parameter/parameter values, as described herein.

Logger 313 includes logic that manages the storage of test result information. The test information may be accessed via a user of end device 150 or other users (e.g., a developer, an end user that invoked the test from another end device 150, etc.). The test result information may be obtained from testing device 120 via single tester 315 or multi-tester 317.

Single tester 315 includes logic that initiates, performs, and obtains test result information pertaining to a single test. Single tester 315 includes logic that communicates with testing device 120 to initiate, perform, and obtain the test result information. For example, single tester 315 may generate and transmit messages to testing device 120, and receive messages from testing device 120. According to an exemplary embodiment, single tester 315 generates and transmits a test request, which is to initiate a test, to testing device 120. Single tester 315 may generate the test request without compilation, which can reduce the latency for initiating and performing a test relative to other speed testing systems. Additionally, the parameters and the parameter values do not depend on data model requirements associated with various management protocols (e.g., CWMP, etc.).

FIG. 3B is a diagram illustrating an exemplary packet that may carry a test request. For example, the test request may be carried in a single UDP packet. The test request includes parameters and parameter values in accordance with a data model, as described herein. As illustrated, a test request packet 350 includes various fields. For example, a source port field 352 indicates a source port, and a destination port field 354 indicates a destination port pertaining to a test. Length 356 indicates the size of the packet (e.g., in bytes). Checksum 358 indicates a checksum value, which may be used for error-checking. Media Access Control (MAC) address field 360 may indicate a unique address. Command field 362 indicates commands for scheduling a test. Command field 362 is described further in relation to FIG. 3B.

Referring to FIG. 3B, command field 362 may include 16 bits of data, which are also referenced by way of reference numbers 380-395 in the diagram. Bit 0 (395) indicates whether a download test request (DTR) is being made. For example, if the value is 1, agent 155 is requesting a download test, and if the value is 0, agent 155 is not. Bit 1 (394) indicates whether an upload test request (UTR) is being made. For example, if the value is 1, agent 155 is requesting an upload test, and if the value is 0, agent 155 is not. Bits 2-4 (391-392) indicate the type of test/protocol. For example, if bits 3, 4, and 5 are set to zero, the type of test may be an HTTP test, whereas if bit 3 is set to one, and bits 4 and 5 are set to zero, the type of test may be an FTP test. According to various exemplary implementations, the values of bits 2-4 may be mapped to different types of test, as described herein. Bits 5-7 (388-390) indicate the client version of agent 155. For example, the client version of agent 155 may impact the version of a message (e.g., a test request). Bits 8 and 9 (386 and 387) are set by testing device 120, which will be described later in this description. Bit 10 (385) indicates a next request time (NRT). The initial value of bit 10 may be set to zero. However, as described further below, if the test request cannot be performed within a time requested by agent 155, testing device 120 may respond with a Coordinated Universal Time (UTC) time.

Bit 11 (384) may be used if download/upload URIs are provided by agent 155. If agent 155 does not provide a URL, bit 11 may be set with a value of zero. If agent 155 does provide a URL, bit 11 may be set with a value of one. When agent 155 does provide a URL, the URL (e.g., download and/or upload) may include the port/socket information along with the test duration on which the test should be started and completed. For example, the format of an HTTP test URL may be http://{localhost}:{Port}/timebased-mode_{5}, in which {5} may indicate the test duration for each directional test. According to another example, for a UDP throughput test, the format of the URL may be UDP-Throughput://{localhost}:{Port}/{Testincrements}:{Port}. Bits 12-14 (381-383) may indicate the number of threads associated with a test. Bit 15 (380) may indicate whether a wait for idle is enabled.

According to other exemplary embodiments, command field 362 may indicate additional, fewer, and/or different commands than those described herein. Accordingly, the number of bits, the type of commands, and the values associated with commands and/or information are exemplary.

Referring back to FIG. 3B, command extension field 364 may store additional commands and/or information (e.g., options and option values), as described herein. These commands and/or options may be stored in the JAVA file (e.g., JAR), as previously described, and at testing device 120. According to various exemplary implementations, testing device 120 may include information in this field in a test response and/or agent 155 may include information in this field in a test request. For example, Table 2 illustrates additional information that may implemented.

TABLE 2

| Option | Description |
| --- | --- |
| Configuration file | Specify location |
| DNS server address | Specify DNS server address |
| Download size | Expected download size (e.g., in bytes) |
| Increment Duration | Duration of test increments |
| OLT ID | Specify ID of OLT |

TABLE 2-continued

| Option | Description |
| --- | --- |
| ONT ID | Specify ID of ONT |
| Router ID | Specify ID of Router |
| SSL | Specify whether Test Result should be sent by secured connection (e.g., TCP) |
| TWAMP Configuration | Specify configuration file for TWAMP test |
| UDP Packet version | Specify whether UDP should have 122 bytes (0) or 320 bytes (1) |
| Upload Size | Specify the number of bytes to upload |
| Test Repeat Count | Specify the number of times a test should be executed (e.g., default is 1) |
| Send Request | Whether to send a Test Request packet |
| Send Results | Whether to send a Test Result to Server |
| Speed Tier Scaling | Specify the Speed Tier Scaling used to divide the speed tiers before putting them in the Test Request |

Speed tier field 366 may indicate a speed tier value of user device 150/agent 155. For example, speed tier field 366 may indicate a value that indicates a download speed for user device 150/agent 155, and/or an upload speed. For example, speed tier field 366 may indicate a value, such as 25 Mbps, 100 Kb/s, or some other value/bit rate. Next_request_time field 368 may indicate the UTC time, as previously described, which may be included in a test response, by testing device 120.

Reserved field 370 may be reserved to indicate an input provided by user 160. For example, reserved field 370 may indicate a serial number of end device 150 or an identifier of a device other than end device 150 (e.g., CPE, uCPE, etc.). Download URL field 374 may indicate a download URL, and upload URL field 376 may indicate an upload URL. Depending on the exemplary scenario, as described herein, the test request may include this information, or testing device 120 may include this information in a test response.

Test_request_interval field 378 may indicate an interval at which agent 155 transmits a test request packet to tester 210. The test request packet sent delay is measured in seconds. For example, test_request_interval=10, the first test request packet to controller 205 will be sent after 10 seconds of the API request. If a multi-test is triggered, the initial test may be delayed based on the testrequest interval value. For example, the test request interval value may be added to the "period" option (e.g., test_request_interval+period=UDP test request packet sent time).

According to other exemplary embodiments, the test request may indicate additional, fewer, and/or different fields than those described herein. Accordingly, the number of fields, the type of fields, and the values associated with fields are exemplary.

Referring back to FIG. 3A, multi-tester 317 includes logic that initiates, performs, and obtains test result information pertaining to multiple tests. Multi-tester 317 may be configured to initiate multiple tests according to a schedule. For example, the number of tests over a certain period of time may be configured. Multi-tester 317 includes logic that communicates with testing device 120 to initiate, perform, and obtain the test result information. For example, multi-tester 317 may generate and transmit messages to testing device 120, and receive messages from testing device 120. According to an exemplary embodiment, multi-tester 317 generates and transmits a test request, which is to initiate a test, to testing device 120. The test request may include the data model, as described herein. Multi-tester 317 may generate the test request without compilation, which can reduce the latency for initiating and performing a test relative to other speed testing systems. Additionally, the parameters and the parameter values do not dependent on data model requirements associated with various management protocols (e.g., CWMP, etc.).

Device portal 325 includes logic that exposes agent 155 to a service provider to configure and manage agent 155 and the speed testing service at the end user-side. According to an exemplary embodiment, device portal 325 includes an API interface. In this way, a user may access, configure, manage, etc, agent 155 based on API messages. For example, the user may be able to use more complex parameters, change test parameter values (e.g., packet size, test duration, test schedules, different test form selection, etc.), and expose any of the available parameters to OSS device 115. The user may be able to perform all actions available to customers, modify and update the API definition file, allow and restrict access to the speed testing service, and manage test result information stored by agent 155.

Logger storage 330 includes logic that stores test result information and all files that provide the speed testing service. For example, logger storage 330 may store the JAVA file (JAR). Additionally, for example, logger storage 330 may store a .tar file. The .tar file may include test client files, instruction files for users, documentation for server usage and path, logging instructions, and API platform dependencies.

FIG. 4 is a diagram illustrating exemplary components of a device 400 that may be included in one or more of the devices described herein. For example, device 400 may correspond to components included in a network device of network 110 and end device 150. The components previously described in relation to FIGS. 2 and 3 may be implemented based on the components of device 400. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to network devices of network 110, software 420 may include an application that, when executed by processor 410, provides the functions of the speed testing service, as described herein. Additionally, with reference to end device 150, software 420 may include an application that, when executed by processor 410, provides the functions of the speed testing service, as described herein. Software 420 may also include firmware, middleware, microcode, hardware description language (HDL), and/or other form of instruction. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces (e.g., electrical, optical). For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, API, etc.). Communication interface 425 may be implemented as a point-to-point interface, a service based interface, and/or other type of communication interface.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
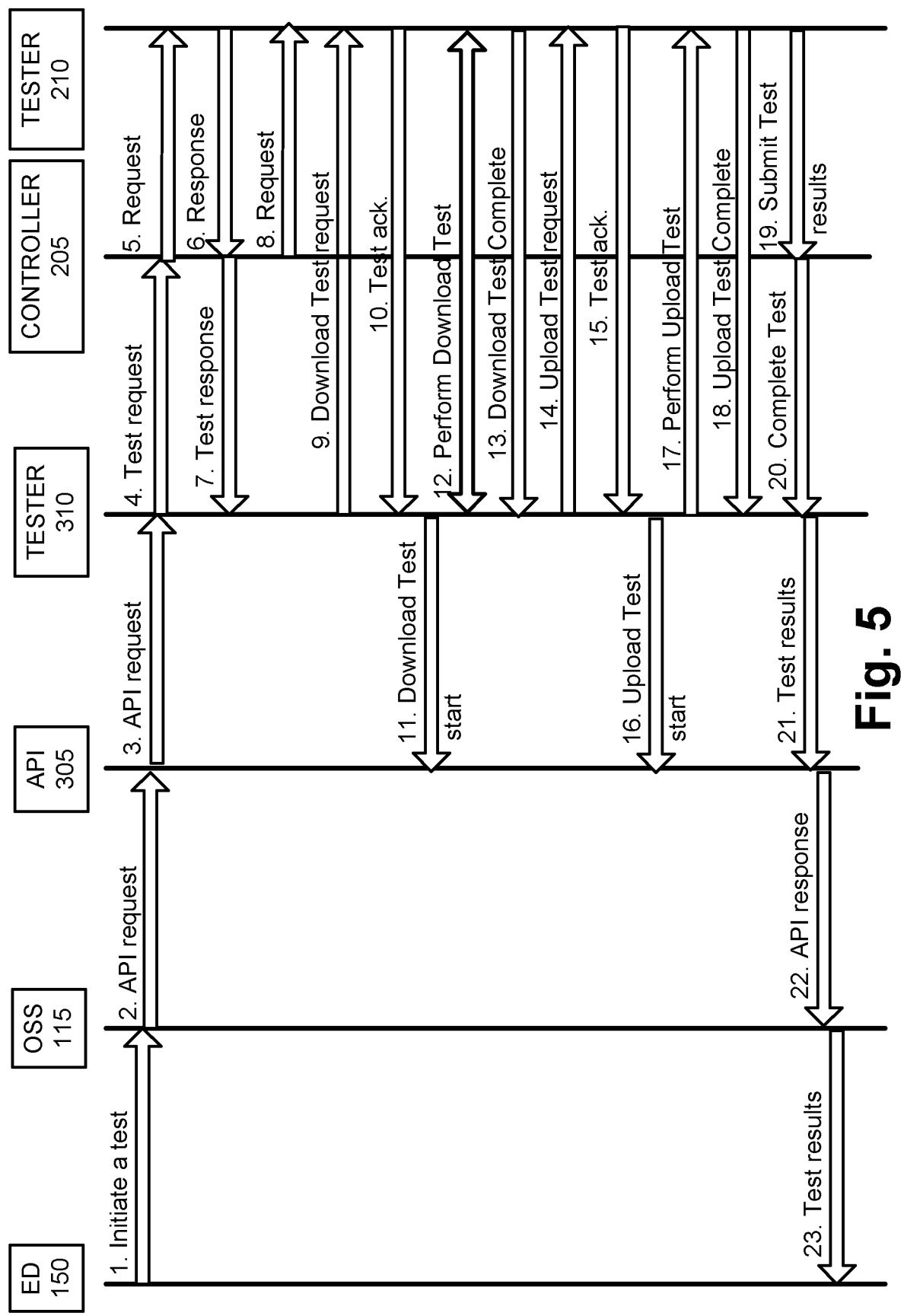
FIG. 5 is a diagram illustrating an exemplary process of the speed testing service.

FIG. 5 is a diagram illustrating an exemplary process of the speed testing service according to an exemplary scenario. Referring to FIG. 5, assume that user 160 wishes to initiate the speed testing service via end device 150. According to an exemplary scenario, user 160 may initiate a test from one end device in order to test another end device. For example, user 160 may initiate the test from a mobile device or a desktop computer so as to test a router or other CPE/uCPE. According to another exemplary scenario, user 160 may initiate a test from an end device that is also the end device to be tested. For example, user 160 may initiate the test from a mobile device in order to test the mobile device. According to various exemplary implementations of the former scenario, the mobile device or the desktop computer may or may not include agent 155. For example, user 160 may initiate the test via OSS 115 using a web browser, a mobile application, or other software. However, the end device to be tested does include agent 155.

According to the exemplary scenario described in relation to FIG. 5, the type of test may be considered a single test that includes a download speed test and an upload speed test. According an exemplary implementation, the download speed test and the upload speed test may be performed serially and during one session with testing device 120 (e.g., a single API session). According to other exemplary scenarios, multiple tests may be performed via multiple sessions occurring on different dates and/or at different times according to a schedule. As previously described, the period parameter and the period parameter value, which may be included in the API request, may indicate whether a single test or multiple tests are to be performed.

User 160 establishes a session via end device 150 with OSS device 115. According to an exemplary scenario in which user 160 wishes to initiate a test of a CPE/uCPE, user 160 may log into OSS device 115 before initiating a test. User 160 may be required to provide credentials before afforded access to the speed testing service and the ability to perform a test. According to other exemplary scenarios, in which user 160 wishes to initiate a test from the same end device that is to be tested, this may not be the case. As illustrated in FIG. 1, end device 150 may generate and transmit a request to initiate a test (1). The request may include a network address and/or an identifier of the end device to be tested. The request may also indicate the type of test to be performed. Additionally, for example, the request may include location information pertaining to the end device to be tested. In response to receiving the request, OSS device 115 may select testing device 120, as previously described. Subsequent to the selection of testing device 120, OSS device 115 may generate and transmit an API request (2) to the end device 150 to be tested. The API request may include a URI of the selected testing device 120. The API request may also indicate other information (e.g., the type of test to be performed, a URI and/or an identifier of the end device to be tested, a URI and/or an identifier of the end device that initiated the API request (which may or may not be the same as the URI/identifier of the end device to be tested)).

API processor 305 may be listening for API requests on one or multiple ports (e.g., UDP port(s), etc.), and subsequent to the transmission of the API request, receives the API request from OSS device 115. API processor 305 may pass the API request (3) to tester 310. API processor 305 may start a timer, which tracks a wait time for obtaining the test result information, based on the API definition file.

In response to receiving the API request, test setup 311 may select a JAVA jar file and a library that is configured to initiate the type of test requested. The JAVA jar file may include the default parameters, default parameter values, and other information (e.g., options, option values) that may be used to initiate a test, conduct the test, and obtain test result information. For example, the default parameters, default parameter values, and other information may be correlated to the type of test requested.

According to this exemplary scenario, the type of test may be a single test (versus a multiple test). Single tester 315 may use the JAVA jar file and the library to generate a test request. In contrast to other speed testing systems, single tester 315 may generate the test request without compiling the default parameters and the default parameter values. That is, as previously described, agent 155 may minimize latency and use of resources of end device 150 because the default parameters and default parameter values are not received from a device external from end device 150 and other processing (e.g., parsing and extraction of the default parameters and default parameter values from the received message, temporarily storing the default parameters/values, formatting/syntax according to the management protocol, etc.) may be avoided in order to generate the test request. Additionally, a user is not required to specify each parameter that pertains to a test request/test response and results of test. However, as described herein, default options may be overwritten when specified by a user. For example, if a default for testing is an HTTP test, the user may specify a UDP throughput test.

In response to the generation of the test request, agent 155 transmits the test request (4) to the selected testing device 120. For example, the payload of a single UDP packet carries the test request. Subsequent to the transmission to the transmission of the test request, tester interface 207 of controller 205 may receive the test request from agent 155 of end device 150. Controller 205 may parse and read the test request based on the data model and the field structure of the test request. For example, controller 205 may identify the type of test requested based on reading the values included in command field 362 and any options based on reading the values included in command extension field 364. As previously described, controller 205 may select one or multiple testers 210 for performing the test based on load balancing considerations and/or capabilities of testers 210. For example, as illustrated in FIG. 5, tester interface 207 may generate and transmit a request (5) to tester 210, which includes a request of availability to perform a test, and a response (6) may be transmitted back indicating whether tester 210 is available to perform the test. According to this exemplary scenario, assume that tester 210 accepted to perform the test.

In response to receiving the response, agent interface 206 generates a test response, which is responsive to the received test request from agent 155. According to this example, assume that bits 0 and 1 in command field 362 of the test request, were set to values indicating that a download test and an upload test are requested. Based on the scheduling of the test, agent interface 206 generates the test response, which includes bits 8 and 9 set to values indicating that the download test and the upload test are enabled. Additionally, for example, agent interface 206 generates the test response, which includes the URL of tester 210 in download URL field 374 and the URL of tester 210 in upload URL field 376. Agent interface 206 may also include one or multiple options/option values in command extension field 364 and/or a speed tier value in speed tier field 366. Subsequent to the generation of the test response, agent interface 206 transmits the test response to agent 155. For example, the test response (7) is carried in a single UDP packet. As further illustrated, tester interface 207 may generate and transmit a request (8) to the selected tester 210. The request may include the test parameters, parameter values, options, etc., pertaining to the test that is to be conducted.

Subsequent to the transmission of the test response, tester 310 of agent 155 receives the test response. In response, single tester 315 may parse and read the test response based on the data model and the field structure of the test response. For example, single tester 315 may determine that the download test and the upload test has been enabled based on the values of bits 8 and 9 of command field 362, the URL of tester 210 for performing the upload test and the download test based on fields 374 and 376, and any other information that may be included in command extension field 364, speed tier field 366, and so forth.

As further illustrated, tester 310 may generate and transmit a download test request (9) to tester 210, which is to perform a download test. For example, an HTTP GET request may be generated and transmitted. Subsequent to the transmission of the download test request, tester 210 receives the download test request. Tester 210 may determine whether to accept or reject the request and may make other determinations associated with the test (e.g., whether the test is a size-based test, a time-based test, etc.). In response, tester 210 may generate and transmit a test acknowledgement (10) to agent 155. According to this exemplary scenario, the download test request is accepted. In response to receiving the acknowledgement, tester 310 of agent 155 may pass a download test start message (11) to API processor 305. The download test may be performed, as illustrated in messages (12) and (13).

Messages similar to messages (9)-(13) may be communicated with respect to the upload test, as illustrated by messages (14)-(18). Upon completion of the download and upload tests, tester 210 may generate and transmit a test result (19), which includes test result information pertaining to the tests, to controller 205. The test result information may be stored in storer 215. Controller 205 may transmit the test results to end device 150 via messages (20)-(23). According to this exemplary scenario, the API session is maintained (e.g., stemming from the API request (2)) until the test is completed and the test results are obtained. In case of an error, the API response may include the appropriate error code that corresponds to the reason of failure and a recommendation to mitigate the issue.

Although FIG. 5 illustrates an exemplary process of the speed testing service, according to other exemplary embodiments, the process may include additional, different, and/or fewer steps, include additional, different, and/or fewer messages, and/or involve additional, different, and/or fewer network devices.

Figure 6:
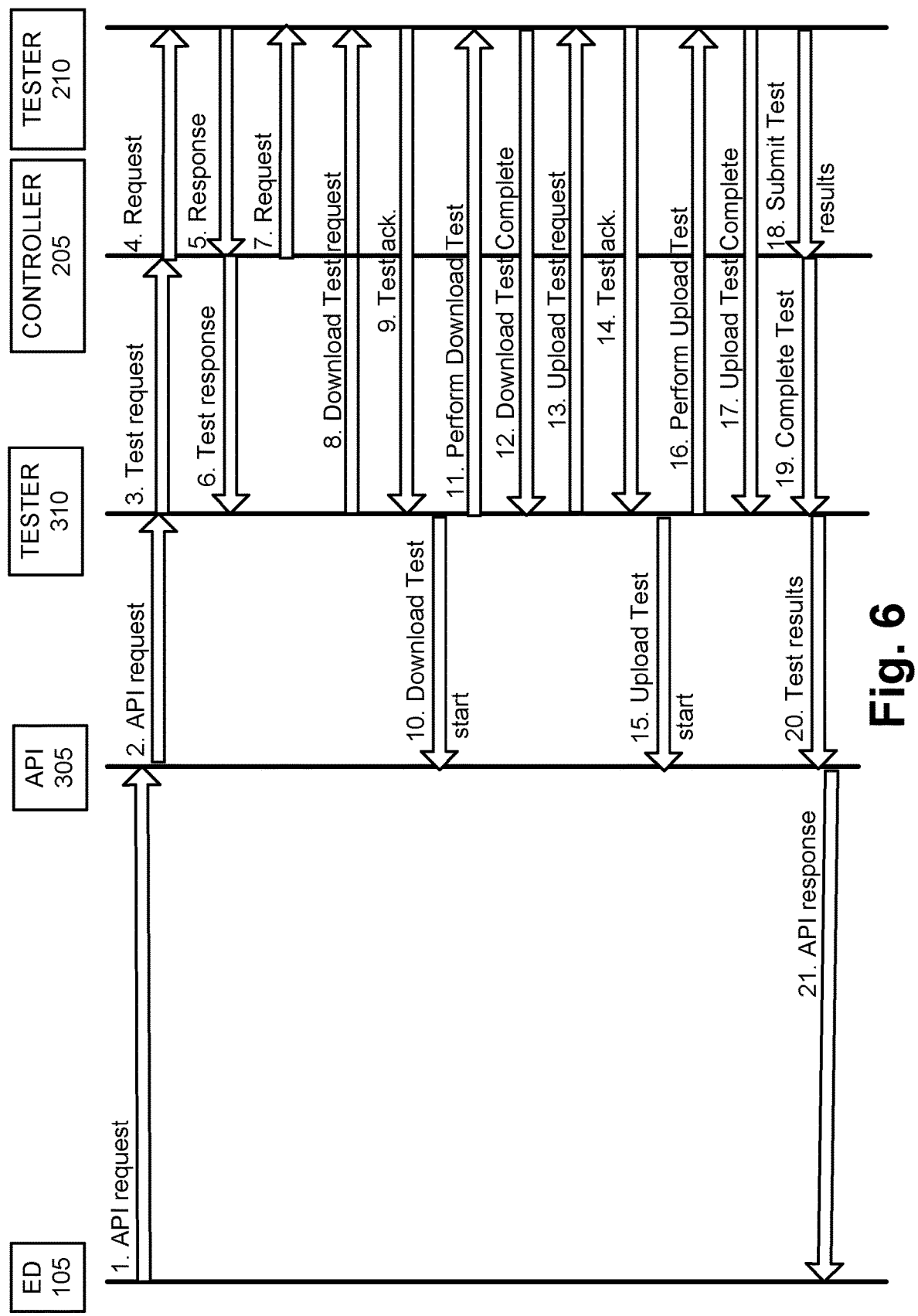
FIG. 6 is another diagram illustrating another exemplary process of the speed testing service.

FIG. 6 is a diagram illustrating another exemplary process of the speed testing service according to an exemplary scenario. Referring to FIG. 6, assume that user 160 wishes to initiate the speed testing service via end device 150. According to this exemplary scenario, assume that user 160 is a developer or a service provider administrator. In contrast to the process illustrated in FIG. 5, user 160 may initiate a test without the use of OSS device 115. The exemplary messages, operations described, etc., in relation to FIG. 5 may be applicable to those exemplary messages (1)-(21), operations, etc., in relation to FIG. 6. Other processes may be performed by developer 160. For example, developer 160 may wish to configure parameter values stored in the JAVA file via device portal 325.

Although FIG. 6 illustrates an exemplary process of the speed testing service, according to other exemplary embodiments, the process may include additional, different, and/or fewer steps, include additional, different, and/or fewer messages, and/or involve additional, different, and/or fewer network devices.

Figure 7:
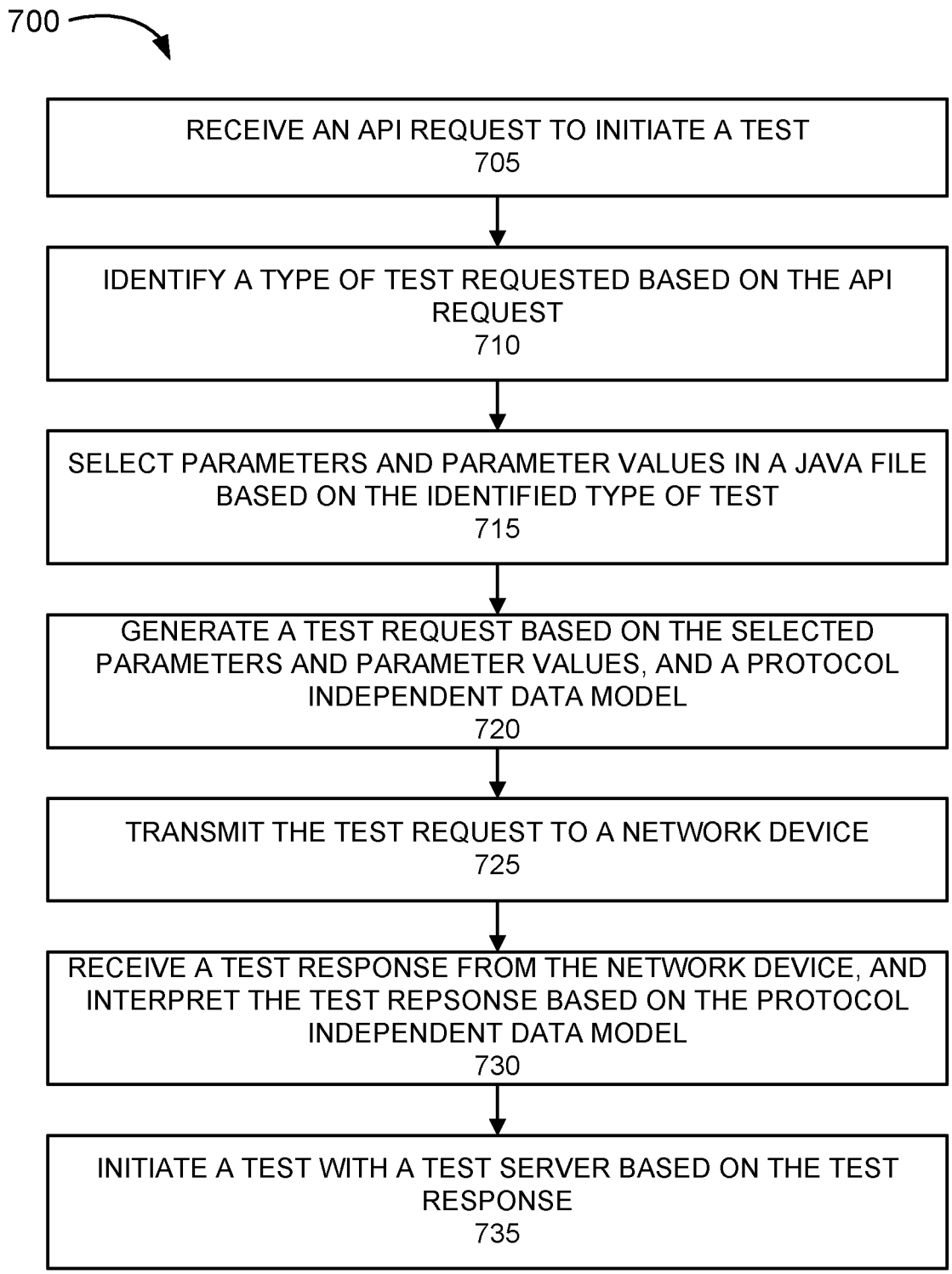
FIG. 7 is a flow diagram illustrating an exemplary process of an exemplary embodiment of the speed testing service at the end device side.

FIG. 7 is a flow diagram illustrating an exemplary process 700 of an exemplary embodiment of the speed testing service. Process 700 is directed to a process previously described with respect to FIG. 5, as well as elsewhere in this description, in which the end user-side of the speed testing service is provided. According to an exemplary embodiment, agent 155 of end device 150 may perform process 700. For example, processor 410 executes software 420 to perform the steps illustrated in FIG. 7, and described herein.

Referring to FIG. 7, in block 705, an AP request to initiate a test is received. For example, API processor 305 may receive the API request. The API request may include a URI of a network device for scheduling a test, and the type of test to be performed. The API request may include other parameters and parameter values, as previously described in relation to Table 1 and elsewhere.

In block 710, a type of test requested may be identified based on the API request. For example, test setup 311 may parse and read the test protocol parameter included in the API request, and determine the type of test requested. Additionally, for example, test setup 311 may determine whether the test is a single test or a multiple test, along with other attributes of the test indicated by other parameters/parameter values included in the API request.

In block 715, parameters and parameter values in a JAVA file are selected based on the identified type of test. For example, single tester 315 may read a JAR file and identify a class that matches the type of test identified in the API request. The class may include various parameters, parameter values, options, and options values pertaining to the type of test indicated by the class. Single tester 315 may select appropriate parameters, parameter values, options, and option values based on the class and the API request.

In block 720, a test request is generated based on the selected parameters and parameter values, and a protocol independent data model. For example, single tester 315 may generate a test request based on the selected parameters, parameter values, options, and option values. Additionally, single tester 315 may generate the test request based on the protocol independent data model, as described herein. Single tester 315 may package the test request in a payload of a single UDP packet.

In block 725, the test request is transmitted to a network device. For example, single tester 315 may transmit the test request in the single UDP packet. In block 730, a test response is received from the network device, and interpreted based on the protocol independent data model. For example, as previously described, single tester 315 may parse and read various fields included in the test response according to the protocol independent data model. In block 735, a test with a test server may be initiated based on the test response. For example, single tester 315 may generate and transmit a request to initiate a test with tester 210. Agent 155 and tester 210 may perform the test, and agent 155 may receive test result information, as previously described.

Although FIG. 7 illustrates an exemplary process 700 of the speed testing service, according to other embodiments, process 700 may include additional operations, fewer operations, and/or different operations than those illustrated in FIG. 7, and described herein.

Figure 8:
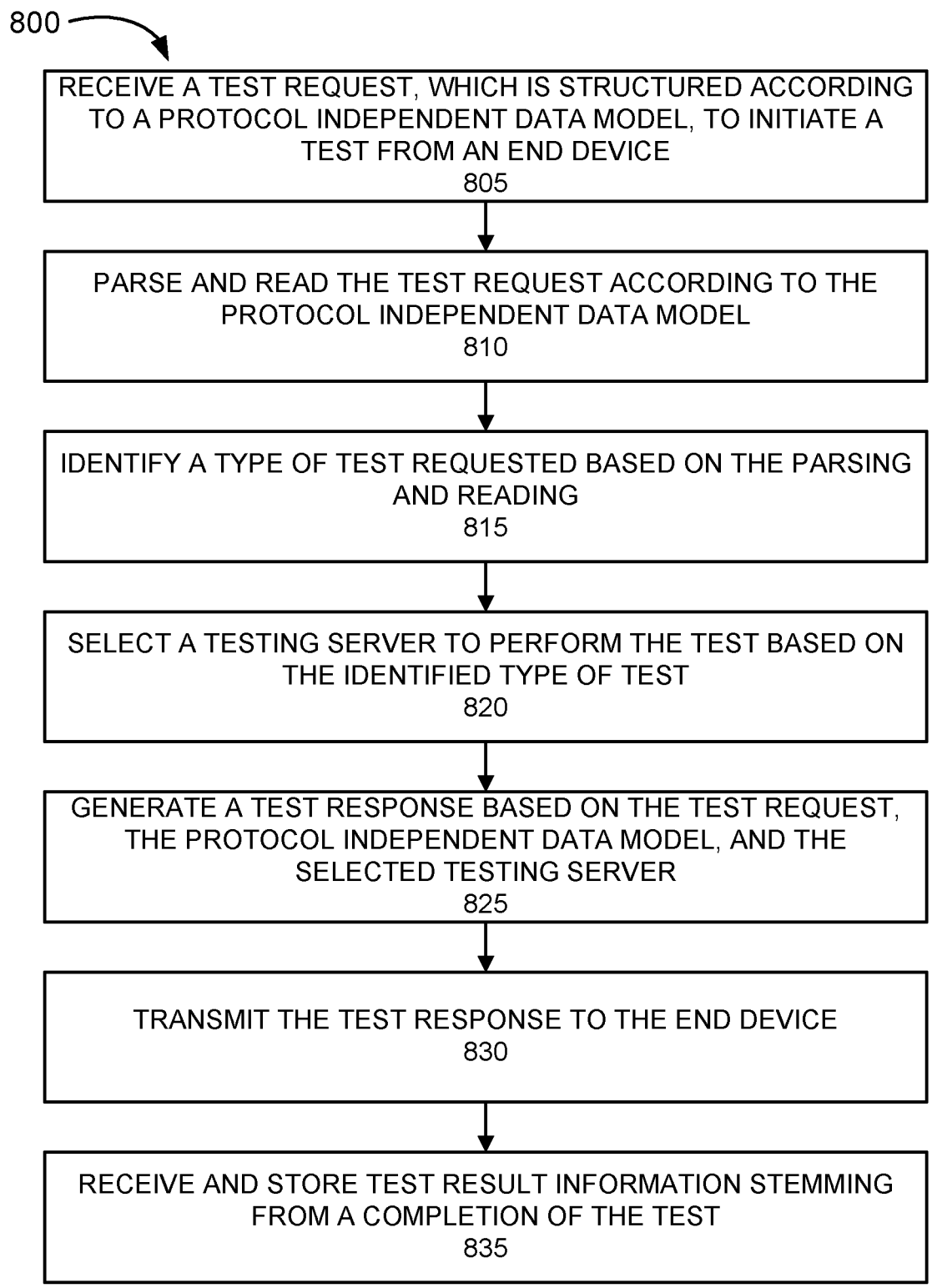
FIG. 8 is a flow diagram illustrating an exemplary process of an exemplary embodiment of the speed testing service at the network side.

FIG. 8 is a flow diagram illustrating another exemplary process 800 of an exemplary embodiment of the speed testing service. Process 800 is directed to a process previously described with respect to FIG. 5, as well as elsewhere in this description, in which a network side of the speed testing service is provided. According to an exemplary embodiment, testing device 120 may perform process 800. For example, processor 410 executes software 420 to perform the steps illustrated in FIG. 8, and described herein.

Referring to FIG. 8, in block 805, a test request to initiate a test, which is structured according a protocol independent data model, is received from an end device. For example, controller 205 may receive a test request from end device 150. The test request may include various fields that are according to the protocol independent data model, as described herein.

In block 810, the test request is parsed and read according to the protocol independent data model. For example, controller 205 may identify the type of test based on command field 362, and other parameters, parameter values, options, option values, etc., based on other fields (e.g., command extension field 364, speed tier field 366, the handling of test result information, the number of concurrent threads etc.) included in the test request, as described herein.

In block 815, a type of test is identified based on the parsing and the reading. For example, controller 205 may determine the type of test requested, as well as other parameter values (e.g., a single test, multiple test, etc.).

In block 820, a testing server is selected to perform the test based on the identified type of test. For example, controller 205 may select tester 210 based on load balancing considerations and the type of test to be conducted, as previously described. Controller 205 may query testers 210 to identify availability, and receive responses from testers 210.

In block 825, a test response is generated based on the test request, the protocol independent data model, and the selected testing server. For example, controller 205 may generate a test response that is responsive to the received test request. The test response may include the URI of the selected tester 210, which is to conduct the test, values included in the test request (e.g., data included in command field 362 and other fields), and modified values in various fields of the test request (e.g., data included in command field 362 and other fields). Additionally, controller 205 may generate the test response based on the protocol independent data model, as described herein. Controller 205 may package the test response in a payload of a single UDP packet.

In block 830, the test response is transmitted to the end device. For example, controller 205 may transmit the test response to end device 150 in the single UDP packet.

In block 835, test result information, which stems from a completion of the test, is received and stored. For example, subsequent to the completion of the test, controller 205 may receive test result information. Controller 205 may store the test result information. Additionally, for example, controller 205 may transmit the test result information to end device 150, as previously described.

Although FIG. 8 illustrates an exemplary process 800 of the speed testing service, according to other embodiments, process 800 may include additional operations, fewer operations, and/or different operations than those illustrated in FIG. 8, and described herein.

As set forth in this description and illustrated by the drawings, reference is made to "an exemplary embodiment," "an embodiment," "embodiments," etc., which may include a particular feature, structure or characteristic in connection with an embodiment. However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and the drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or any implementation described as "exemplary" is not necessarily to be construed as preferred or advantageous over other embodiments or implementations.

In addition, while series of blocks have been described with regard to the processes illustrated in FIGS. 7 and 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in the description and the drawings should be construed as critical or essential to the embodiments described herein unless explicitly described as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by a network device and from an end device, a test request to initiate a test with the end device, wherein the test request is structured according to a protocol independent data model that has no dependency on a management protocol including a Customer-Premises Equipment Wide Area Network Management Protocol (CWMP) and a Simple Network Management Protocol (SNMP), and the test request indicates a type of test and includes all parameters and values to initiate, conduct, and obtain a test result of the test, and wherein the parameters and values originate from the end device, and wherein the type of test includes at least one of an upload test or a download test;
   parsing and reading, by the network device, fields included in the test request according to the protocol independent data model;
   identifying, by the network device, the type of test requested based on the parsing and the reading;
   selecting, by the network device, a testing device to perform the test;
   generating, by the network device, a test response based on the test request, the selected testing device, and the protocol independent data model; and
   transmitting, by the network device and to the end device, the test response.

2. The method of claim 1, wherein the test request is carried in a first payload of a first single User Datagram Protocol (UDP) packet, and the test response is carried in a second payload of a second single UDP packet, and the method further comprising:
   performing, by the network device, the test;
   generating, by the network device, test results based on the performing; and
   transmitting, by the network device and to the end device, the test results.

3. The method of claim 1, wherein the parsing and the reading comprises:
   locating, by the network device, a command field of the fields that includes a download test request bit and an upload test request bit; and
   determining, by the network device, a value of the download test request bit and a value of the upload test request bit, and wherein the identifying further comprises:
   identifying, by the network device, the type of test requested based on the value of the download test request bit and the value of the upload test request bit.

4. The method of claim 3, wherein, when the type of test, based on the value of the download test request bit and the value of the upload test request bit, indicates that a download test and an upload test are requested, and the selected testing device is to perform a download test and an upload test, the generating further comprises:
   locating, by the network device, the command field of the fields that includes a download test enabled bit and an upload test enabled bit;
   setting, by the network device, a value of the download test enabled bit to indicate that the download test is enabled; and
   setting, by the network device, a value of the upload test enabled bit to indicate that the upload test is enabled.

5. The method of claim 1, wherein the parsing and the reading comprises:
   locating, by the network device, a command field of the fields that includes a single value represented by three bits, and wherein the identifying further comprises:
   identifying, by the network device, the type of test requested based on the single value represented by the three bits, wherein the type of test requested includes a User Datagram Protocol (UDP) throughput test, a File Transfer Protocol (FTP) test, a Hypertext Transfer Protocol (HTTP) test, or a Domain Name System (DNS) test.

6. The method of claim 1, wherein the parsing and the reading comprises:
   locating, by the network device, a command field of the fields that includes a single value represented by three bits; and
   determining, by the network device, a number of concurrent threads to be conducted during the test based on the single value.

7. The method of claim 1, wherein the parsing and the reading comprises:

locating, by the network device, a speed tier field of the fields that indicates at least one of an upload speed tier value or a download speed tier value in relation to the end device; and determining, by the network device, a bits per second rate for conducting at least one of a download test or an upload test.

8. The method of claim 1, wherein the end device is one of a device that is operated by a user, or customer premise equipment of the user, and the at least one of the upload test or the download test is an upload speed test or a download speed test.

9. A network device comprising:
a communication interface;
a memory, wherein the memory stores instructions; and
a processor, wherein the processor executes the instructions to:
  receive, via the communication interface and from an end device, a test request to initiate a test with the end device, wherein the test request is structured according to a protocol independent data model that has no dependency on a management protocol including a Customer-Premises Equipment Wide Area Network Management Protocol (CWMP) and a Simple Network Management Protocol (SNMP), and the test request indicates a type of test and includes all parameters and values to initiate, conduct, and obtain a test result of the test, and wherein the parameters and values originate from the end device, and wherein the type of test includes at least one of an upload test or a download test;
  parse and read fields included in the test request according to the protocol independent data model;
  identify the type of test requested based on the parsing and the reading;
  select a testing device to perform the test;
  generate a test response based on the test request, the selected testing device, and the protocol independent data model; and
  transmit, via the communication interface and to the end device, the test response.

10. The network device of claim 9, wherein the test request is carried in a first payload of a first single User Datagram Protocol (UDP) packet, and the test response is carried in a second payload of a second single UDP packet, and wherein the processor further executes the instructions to:
  perform the test;
  generate test results based on the performance of the test; and
  transmit, via the communication interface and to the end device, the test results.

11. The network device of claim 9, wherein, when parsing and reading, the processor further executes the instructions to:
  locate a command field of the fields that includes a download test request bit and an upload test request bit; and
  determine a value of the download test request bit and a value of the upload test request bit, and wherein, when identifying the processor further executes the instructions to:
  identify the type of test requested based on the value of the download test request bit and the value of the upload test request bit.

12. The network device of claim 11, wherein, when the type of test, based on the value of the download test request bit and the value of the upload test request bit, indicates that a download test and an upload test are requested, and the selected testing device is to perform a download test and an upload test, wherein when generating, the processor further executes the instructions to:
  locate the command field of the fields that includes a download test enabled bit and an upload test enabled bit;
  set a value of the download test enabled bit to indicate that the download test is enabled; and
  set a value of the upload test enabled bit to indicate that the upload test is enabled.

13. The network device of claim 9, wherein, when parsing and reading, the processor further executes the instructions to:
  locate a command field of the fields that includes a single value represented by three bits, and wherein, when identifying the processor further executes the instructions to:
  identify the type of test requested based on the single value represented by the three bits, wherein the type of test requested includes a User Datagram Protocol (UDP) throughput test, a File Transfer Protocol (FTP) test, a Hypertext Transfer Protocol (HTTP) test, or a Domain Name System (DNS) test.

14. The network device of claim 9, wherein, when parsing and reading, the processor further executes the instructions to:
  locate a command field of the fields that includes a single value represented by three bits; and
  determine a number of concurrent threads to be conducted during the test based on the single value.

15. The network device of claim 9, wherein, when parsing and reading, the processor further executes the instructions to:
  locate a speed tier field of the fields that indicates at least one of an upload speed tier value or a download speed tier value in relation to the end device; and
  determine a bits per second rate for conducting at least one of a download test or an upload test.

16. A non-transitory, computer-readable storage medium storing instructions executable by a processor of a network device, which when executed causes the network device to:
  receive, from an end device, a test request to initiate a test with the end device, wherein the test request is structured according to a protocol independent data model that has no dependency on a management protocol including a Customer-Premises Equipment Wide Area Network Management Protocol (CWMP) and a Simple Network Management Protocol (SNMP), and the test request indicates a type of test and includes all parameters and values to initiate, conduct, and obtain a test result of the test, and wherein the parameters and values originate from the end device, and wherein the type of test includes at least one of an upload test or a download test;
  parse and read fields included in the test request according to the protocol independent data model;
  identify the type of test requested based on the parsing and the reading;
  select a testing device to perform the test;
  generate a test response based on the test request, the selected testing device, and the protocol independent data model; and
  transmit, to the end device, the test response.

17. The non-transitory, computer-readable storage medium of claim 16, wherein the test request is carried in a first payload of a first single User Datagram Protocol (UDP) packet, and the test response is carried in a second payload of a second single UDP packet, and wherein the instructions to parse and read further comprise instructions to:
  locate a command field of the fields that includes a download test request bit and an upload test request bit; and
  determine a value of the download test request bit and a value of the upload test request bit, and wherein, when identifying the processor further executes the instructions to:
  identify the type of test requested based on the value of the download test request bit and the value of the upload test request bit.

18. The non-transitory, computer-readable storage medium of claim 17, wherein, when the type of test, based on the value of the download test request bit and the value of the upload test request bit, indicates that a download test and an upload test are requested, and the selected testing device is to perform a download test and an upload test, wherein the instructions to generate further comprise instructions to:
  locate the command field of the fields that includes a download test enabled bit and an upload test enabled bit;
  set a value of the download test enabled bit to indicate that the download test is enabled; and
  set a value of the upload test enabled bit to indicate that the upload test is enabled.

19. The non-transitory, computer-readable storage medium of claim 16, wherein the instructions to parse and read further comprise instructions to:
  locate a command field of the fields that includes a single value represented by three bits, and wherein the instructions to identify further comprise instructions to:
  identify the type of test requested based on the single value represented by the three bits, wherein the type of test requested includes a User Datagram Protocol (UDP) throughput test, a File Transfer Protocol (FTP) test, a Hypertext Transfer Protocol (HTTP) test, or a Domain Name System (DNS) test.

20. The non-transitory, computer-readable storage medium of claim 16, wherein the instructions to parse and read further comprise instructions to:
  locate a command field of the fields that includes a single value represented by three bits; and
  determine a number of concurrent threads to be conducted during the test based on the single value.

* * * * *